UNITED STATES PATENT OFFICE.

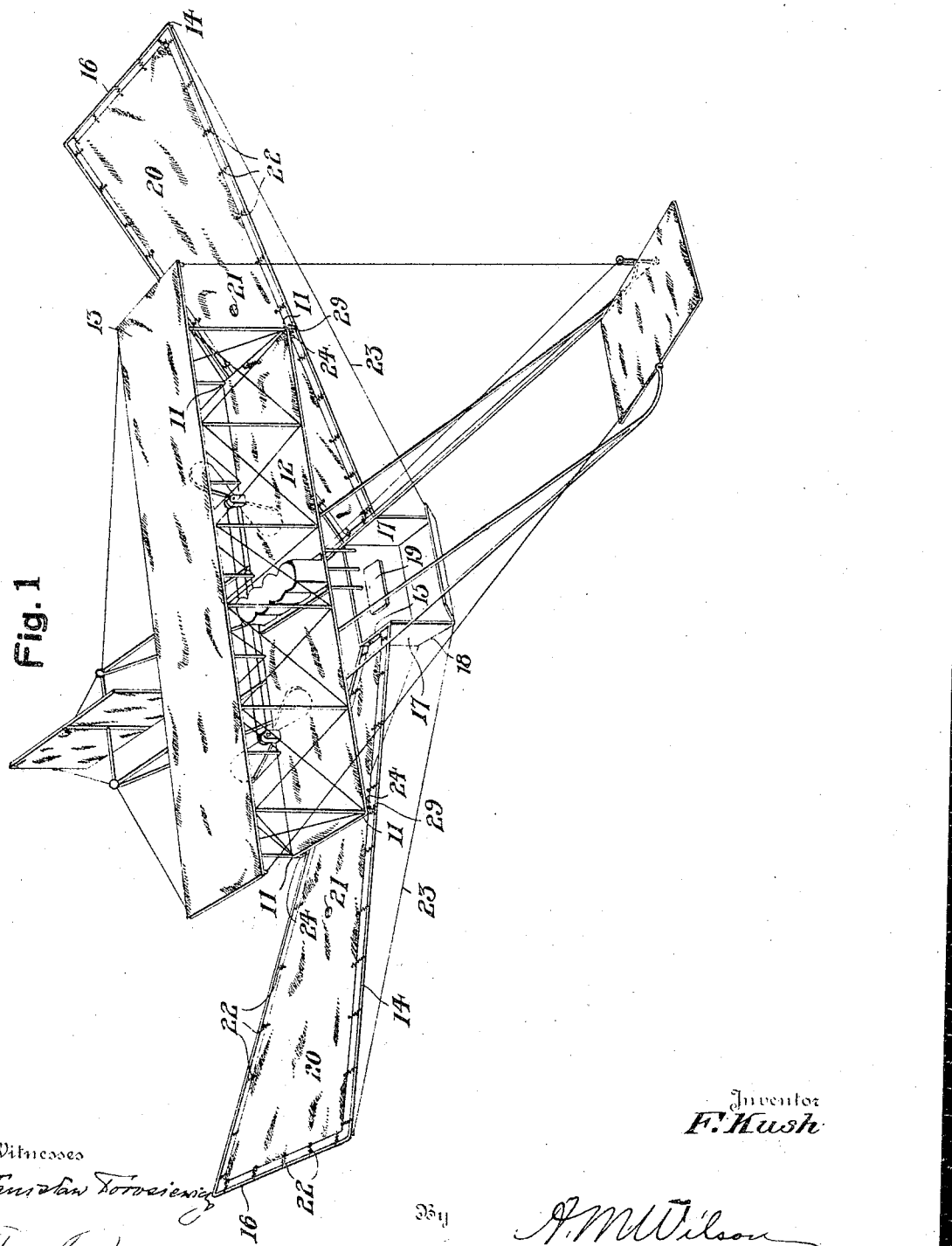

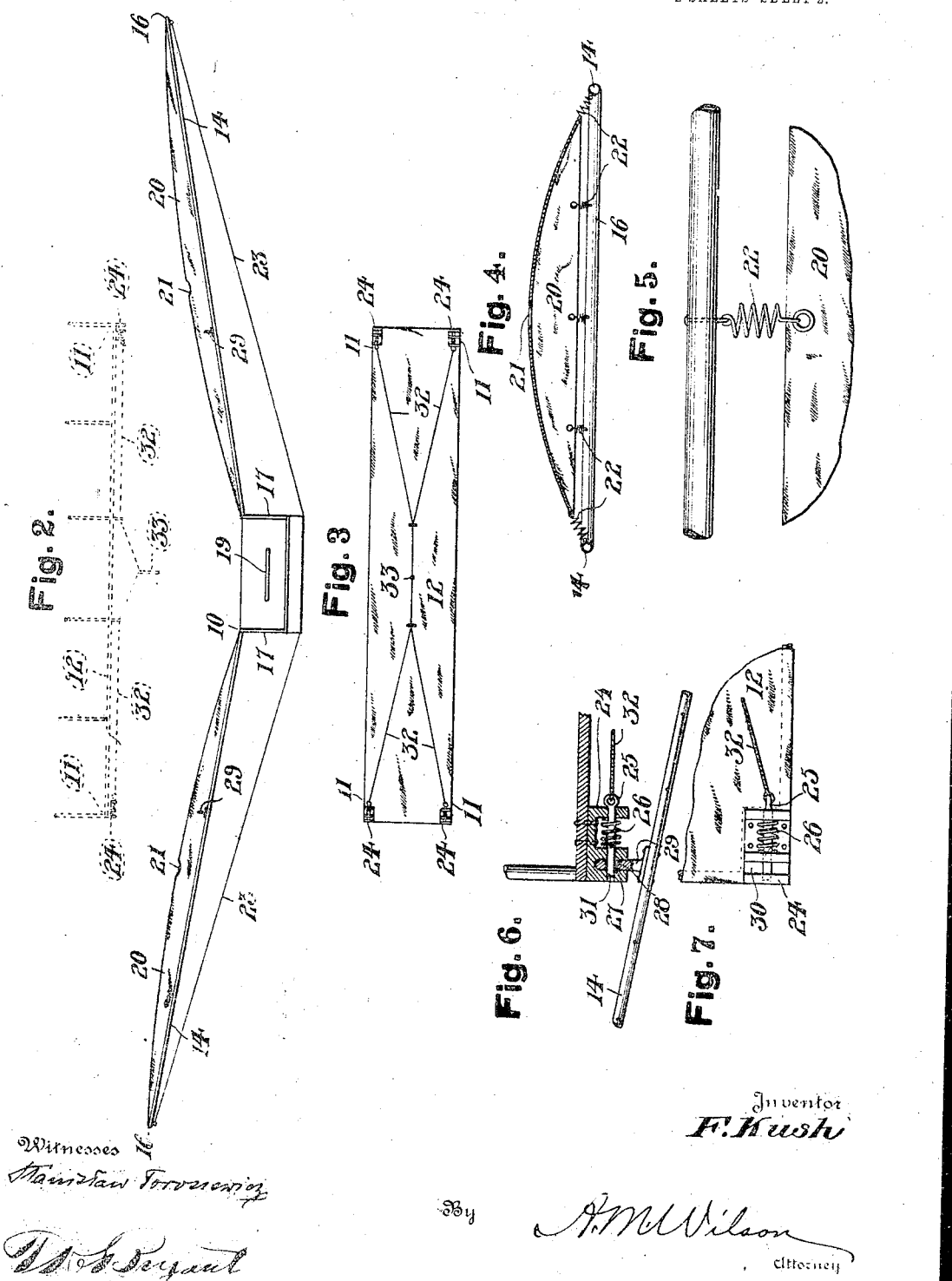

FRANK KUSH, OF JOHNSTOWN, PENNSYLVANIA.

RELEASABLE PARACHUTE FOR AEROPLANES.

1,124,623.
Specification of Letters Patent.
Patented Jan. 12, 1915.

Application filed September 16, 1914. Serial No. 862,024.

*To all whom it may concern:*

Be it known that I, FRANK KUSH, subject of the Emperor of Austria-Hungary, residing at Johnstown, in the county of Cambria and State of Pennsylvania, have invented certain new and useful Improvements in Releasable Parachutes for Aeroplanes, of which the following is a specification.

This invention relates to certain new and useful improvements in releasable parachutes for aeroplanes.

The primary object of this invention is to provide a parachute member having a car for the aeronaut and readily releasable from a supporting aeroplane whenever desirable and whereby the occupant of the car may alight with safety from great altitudes.

A further object is to provide a parachute attached to an aeroplane and readily released therefrom upon the pulling of a cord by the aeronaut within a car of the parachute and serviceable in preventing accidents to the passengers upon any injury or failure of operation of the aeroplane.

A still further object is to provide resiliently mounted flexible angularly positioned aeroplane wings upon a passenger car and providing a readily releasable connection between the said wings and a superposed aeroplane to which the wings and the car are suspended.

With the above general objects in view and others that will appear as the nature of the invention is better understood, the same consists in the novel combination and arrangement of parts to be hereinafter more fully described, illustrated in the accompanying drawings and set forth in the appended claims.

In the drawings forming a part of this application and in which like-designating characters refer to corresponding parts throughout the several views, Figure 1 is a perspective view of an aeroplane with the parachute suspended therefrom. Fig. 2 is a detail view in dotted lines of one edge of the lower plane of the aeroplane and showing the parachute-releasing means upon its lower side, and also illustrating therebeneath in front elevation the parachute attachment released from the aeroplane and with its wings inflated as positioned during a descent. Fig. 3 is a bottom plan view of the lower plane of the aeroplane. Fig. 4 is a vertical central transverse sectional view of one of the side wings of the parachute inflated as shown in Fig. 2. Fig. 5 is an enlarged detail view of one of the spring connections between the frame and fabric member of the parachute wings. Fig. 6 is a vertical detail sectional view of one of the parachute releasing members of the device, and Fig. 7 is a bottom plan view of one of the releasing devices.

Referring more in detail to the drawings the invention broadly consists in detachably suspending a parachute 10 from the four corners 11 of the lower plane 12 of the usual form of aeroplane 13, it being noted however that the parachute attachment is equally as serviceable in connection with any form of air-craft.

The parachute 10 consists of quadrilateral frames 14 forming parts of the side wings thereof and being oppositely positioned and downwardly convergent and with their lower ends 15 which are of less width than their outer ends 16 secured to the upper opposite edges of the sides 17 of the passenger car 18, the latter being provided with a seat 19 for the aeronaut.

Flexible wings 20 preferably formed of canvas and having central openings 21 therethrough are resiliently mounted within the frames 14 by means of connecting springs 22 as illustrated in Fig. 5. Guy wires 23 are connected between the outer corners of the frame 14 and the lower corners of the car 18 for bracing the wings. From this construction of parachute, it will be seen that when the same is released from the aeroplane 13 and descends through the air, the air will inflate the canvas wings 20 and a portion thereof passes through the openings 21 which allow for such inflating action to act more freely, it being noted that the springs 22 allow the canvas member 20 to bulge upwardly as shown in Fig. 2 when filled with air therebeneath.

The lower plane 12 of the aeroplane has a bracket 24 at each of the corners 11 within which is slidably mounted a locking latch 25 spring pressed by the encircling spring 26 to span a socket 27 and adapted for passing through the eye 28 of a lug 29 upon the parachute frame 14 as best illustrated in Fig. 6, it being noted that the lug 29 is positionable in the socket 30 of the bracket 24 while the latch is projectable across the socket 30 with its end normally positioned within the opening 31 at the outer end of the bracket. Such a latch being positioned at each of the corners 11 and on the lower side of the lower plane 12, a cord 32 is connected between all of the said latches, and has a depending centrally positioned pull-string 33 which normally depends above the seat 19 of the car and within grasping distance of the aeronaut. It will thus be seen, that whenever an occupant of the car so desires, he may pull the string 33 and thus simultaneously release all of the latches 25 thereby detaching the parachute from the aeroplane and the parachute and its passengers will be free to descend to the ground without danger of injury.

What I claim as new is:—

1. A device of the class described comprising in combination with the lower plane of an aeroplane, a passenger car, skeleton quadrilateral frames secured to the opposite sides thereof and diverging upwardly, flexible wings positioned within said frames, a plurality of spring connectors between the said wings and frames, latches carried at the corners of said lower plane, lugs carried by said frames and engageable with the said latches and tripping means secured to said latches and normally extending to a position adjacent the said car.

2. A detachable parachute comprising a passenger car, rectangular frames having their outer ends of greater width than their inner ends and positioned upwardly divergent with their ends rigidly secured to the top edges of the opposite sides of the car, flexible wings having substantially central perforations therethrough and positioned within the said frames and slightly spaced therefrom, supporting springs connecting the said wings with the adjacent sides of the said frames, guy wires from the outer corners of said frames connected to the lower corners of the car, and attaching lugs carried by said frames at opposite points upon the upper sides thereof.

3. In combination with a plane of an aircraft, corner brackets carried upon the lower face of said plane, the said brackets having vertically positioned sockets and alining perforations at each side of the sockets, spring-pressed latches positioned within said perforations and slidably positioned transversely of the sockets, cords connecting the said latches, a pull-string secured to the inner ends of said cords, and parachute-carried lugs receivable within said sockets and having perforations positionable in alinement with the said bracket perforations.

In testimony whereof I affix my signature in presence of two witnesses.

FRANK KUSH.

Witnesses:
JOHN WOODCHOK,
WTOWBYSTOVEN KUSH.